(12) United States Patent
Joliat et al.

(10) Patent No.: US 6,669,630 B1
(45) Date of Patent: Dec. 30, 2003

(54) REMOTE PHYSIOLOGICAL MONITORING SYSTEM WITH CONFIGURABLE SETTINGS

(75) Inventors: Carla C. Joliat, Amesbury, MA (US); Charlotte Swartz, Medford, MA (US)

(73) Assignee: Koninklijke Philips Electronics N. V., Eindhoven (NL)

( * ) Notice: Subject to any disclaimer, the term of this patent is extended or adjusted under 35 U.S.C. 154(b) by 0 days.

(21) Appl. No.: 09/565,886

(22) Filed: May 5, 2000

Related U.S. Application Data (62) Division of application No. 09/054,007, filed on Apr. 2, 1998, now Pat. No. 6,083,007.

(51) Int. Cl.[7] .............................................. A61B 5/00
(52) U.S. Cl. ..................... 600/300; 128/920; 434/262; 340/573.1
(58) Field of Search ................... 434/262, 236–238; 600/300–301; 128/903–904, 920–925; 705/2–4; 607/30–32, 59–60; 340/573.1, 539

(56) References Cited

U.S. PATENT DOCUMENTS

| | | | |
|---|---|---|---|
| 5,602,982 A | * 2/1997 | Judd et al. | 395/326 |
| 5,678,562 A | * 10/1997 | Sellers | 128/904 |
| 5,687,717 A | * 11/1997 | Halpern et al. | 600/300 |
| 6,080,106 A | * 6/2000 | Lloyd et al. | 600/300 |
| 6,083,007 A | * 7/2000 | Joliat et al. | 434/262 |

\* cited by examiner

*Primary Examiner*—Eric F. Winakur
*Assistant Examiner*—Michael Astorino (57) ABSTRACT

An apparatus for generating a data structure containing at least one field corresponding to a setting of a product includes a memory storing a plurality of queries corresponding to various configuration settings of the product. The memory includes a plurality of queries that are presented to a user of the product and/or a user of a training device associated with the product. The apparatus also includes a display for displaying the queries to a user and an input device for providing responses to the queries by the user. The apparatus may also include a training device having a plurality of lessons for training the user on the product. The training device may also include an exam having a plurality of questions that may be presented to the user to test the user's understanding of the product. A method of the present invention configures the lessons presented by the training device to the user and the questions asked by the training device according to the configuration settings stored in the data structure. The data structure can also be used to configure the product according to the configuration settings within the data structure. With this method and apparatus, the product and the training device for the product can be configured according to the data structure. In particular, the training device can be configured to tailor the lessons provided by the training device according to the configuration settings of the product and to tailor the questions asked by the training device.

4 Claims, 12 Drawing Sheets

THAT WAS THE LAST QUESTION.

1. IF YOU HAVE A PRINTER CONNECTED, CLICK PRINT REPORT TO GET A PRINTOUT OF YOUR CONFIGURATION CHOICES.

2. IF YOU WANT TO MAKE A CONFIGURATION DISK AVAILABLE FOR PRODUCT INSTALLATION, INSERT A DISK INTO THE DRIVE PRIOR TO EXITING.

3. CLICK EXIT/SAVE TO CONFIGURE YOUR COMPUTER-BASED TRAINING AND EXIT THE CONFIGURATION COACH.

HELP ME DECIDE —29

PRINT REPORT

31— FACTORY SETTINGS

EXIT/SAVE —35

REMOTE PHYSIOLOGICAL MONITORING SYSTEM WITH CONFIGURABLE SETTINGS

This is a divisional application Ser. No. 09/054,007 filed on Apr. 4,1998 now U.S. Pat. No. 6,083,007.

BACKGROUND OF THE INVENTION

1. Field of the Invention

The invention relates generally to an apparatus and method for configuring computer based training equipment associated with a physiological monitoring product and the physiological monitoring product itself. In particular the invention relates to a method that queries a user with questions to configure the physiological monitoring product, wherein the method provides a data structure that is used to configure the physiological monitoring product and the computer based training equipment.

2. Discussion of the Related Art

Vendors in the medical electronics area have historically delivered training to customers by instructor-led courses for the medical electronics product. Other training devices have included self-paced workbooks, and audio and video based training media. However, each of these training mechanisms has received mixed acceptance and has mixed effectiveness.

In the health-care industry, computer based training is not frequently used, and even when it is used, the training is generic and is not adaptable to a particular environment where the medical electronics product may be used or to a particular configuration of the medical electronics product. In other words, computer based training has historically had the drawback of having relatively fixed, generic lessons. Accordingly, the instructor-based methodology for training, where the instructor adapts his or her presentation to accommodate the specific configurations of the medical electronics product and the environment in order to demonstrate the medical electronics product and train the user on the medical electronics product, has been a much more widely accepted method for training. However, some drawbacks of instructor-based training are that it is expensive for the customer and doesn't offer the flexibility for accommodating hospital schedules and staffing paterns.

Some additional disadvantages of the existing methodologies for configuring a medical electronics product and customer training on the product are, for example, that the customer, when configuring the product, may have insufficient information to make appropriate decisions as to which product setting to select, and thus the product may be configured incorrectly. Also, as discussed above, the computer based training methodology is not adaptable to the different configuration options that are available for the medical electronics product and therefore does not provide adequate training for the different configuration options. Thus, the existing methodologies may be expensive, may lead to incorrect customer-made configuration choices on the product and may result in inadequate training of the users of the product.

SUMMARY OF THE INVENTION

It is an object of the invention to improve upon the conventional methodologies for training customers using a product and for configuring the product. More specifically, it is an object of the present invention to provide a method and apparatus that allows a user to tailor lessons of a computer-based training device according to predefined product settings stored in a data structure and a method and apparatus for configuring the product according to the predefined product settings within the data structure.

According to one embodiment of a method of configuring a product and a training device associated with the product according to the present invention, at least one query of a product setting is provided to a user of the training device or the product. The user, in response to the query, provides a response including a selected product setting. A data structure containing at least one field corresponding to the product setting is updated to indicate the product setting indicated by the response. At least one of the product and the training device are configured according to the at least one field in the data structure. With this method, the product and the training device for the product can be configured according to a previously defined data structure having previously defined product settings.

In addition, the method may include the step of providing the user with sufficient information to allow the user to provide the response to the at least one query. With this method, the data structure can be created or modified without the need for additional information other than that provided by the method and apparatus and without the need for, for example, a customer representative to be at a location where the product and the training device are located.

Furthermore, the step of configuring the training device according to the data structure may include the step of configuring questions asked by the training device, according to the data structure. With this method, the training device can be tailored to test the user on the specific configuration of the product. The training device can also be used, for example, by a manager to track the progress of the user on the product and the results may be used, for example, to obtain certification of the user to operate the product.

According to a physiological monitoring system for monitoring characteristics of a patient of the present invention, the physiological monitoring system has at least one configuration option that may be set to any of a plurality of settings and a means for configuring the physiological monitoring system according to a data structure. The physiological monitoring system also includes the data structure that has at least one configuration field corresponding to the configuration option and a corresponding product setting. With this arrangement, the physiological monitoring system can be configured according to the data structure that can be predefined with the product setting. The physiological monitoring system can be provided to a customer with, for example, the data structure having factory set product settings. The user can then revise the data structure with the method of the invention and the system can be configured according to the revised data structure without the need for, for example, an on site representative and without the need for additional information to be provided to the user.

One embodiment of a training device associated with a product having a plurality of possible product settings has a plurality of lessons for training the user on the corresponding product. At least some of the lessons instruct the user about the operation of the product for a particular product setting. The training device includes a data structure having predefined product settings and a means for configuring which of the lessons will be presented, by the training device, to the user according to the data structure. With this arrangement, the training device can be configured to tailor the lessons of the training device to predefined product settings and to train the user on the apparatus configured according to the product settings.

One embodiment of the training device includes a plurality of questions that may be presented to the user to test the user's understanding of the product. The means for configuring the training device also determines which of the plurality of questions will be presented to the user according to the predefined product settings within the data structure. With this embodiment, the training device can be used to test the user's understanding of the product for the configuration of the product.

According to an embodiment of a computer system of the invention, the computer system can be used to generate a data structure containing at least one field corresponding to a configuration option of the product and including a product setting. The computer system has a memory storing a plurality of queries corresponding to product settings of the product. The computer system also includes a display for displaying the plurality of queries to a user of the computer system and an input device for providing a response to each of the plurality of queries. The computer system also includes a means for updating the data structure to the product setting provided by each response.

According to one embodiment of the computer system, the memory may also include information that can be provided to the user to allow the user to respond to the plurality of queries without the need for additional information.

Another embodiment of the computer system includes a training device having a plurality of lessons for training the user on the product and a means for configuring which of the lessons will be presented to the user by the training device according to the data structure. One embodiment of the training device may include a plurality of questions that are presented to the user to test the user's understanding of the product and a means for configuring which of the plurality of questions will be presented to the user according to the data structure.

With this arrangement, the data structure can be generated and updated to include desired product settings of the product. In addition, with this arrangement, the training device can be configured to provide lessons according to the product settings within the data structure and to train the user on the product for the specific product settings. Further, with this embodiment, the training device can be used to test the user's understanding of the product for the specific configuration of the product. Moreover, with this embodiment, the data structure can be used to configure the product to have the product settings within the data structure.

BRIEF DESCRIPTION OF THE DRAWINGS

For a better understanding of the present invention, reference is made to the accompanying drawings, which are incorporated herein by reference and in which.

DETAILED DESCRIPTION

It is to be understood that for this specification, a product is defined to be any component, system and the like that may be configured to have specific settings for different features of the product from a plurality of possible settings, by reading a data structure containing fields corresponding to the features of the product, wherein each field of the data structure defines a product setting. As will be discussed in detail below, a preferred example of a product according to the invention is a physiological monitoring system. It is also to be understood that a setting according to this specification is defined to be one of a plurality of possible settings for a feature of the product such as, for example, an "on" setting or an "off" setting for an alarm of the physiological monitoring system. It is also to be understood that according to this specification, a configuration option of the product is a possible setting of a feature of the product and that a configuration of the product is defined to be a particular group of settings of the product.

Figure 1:
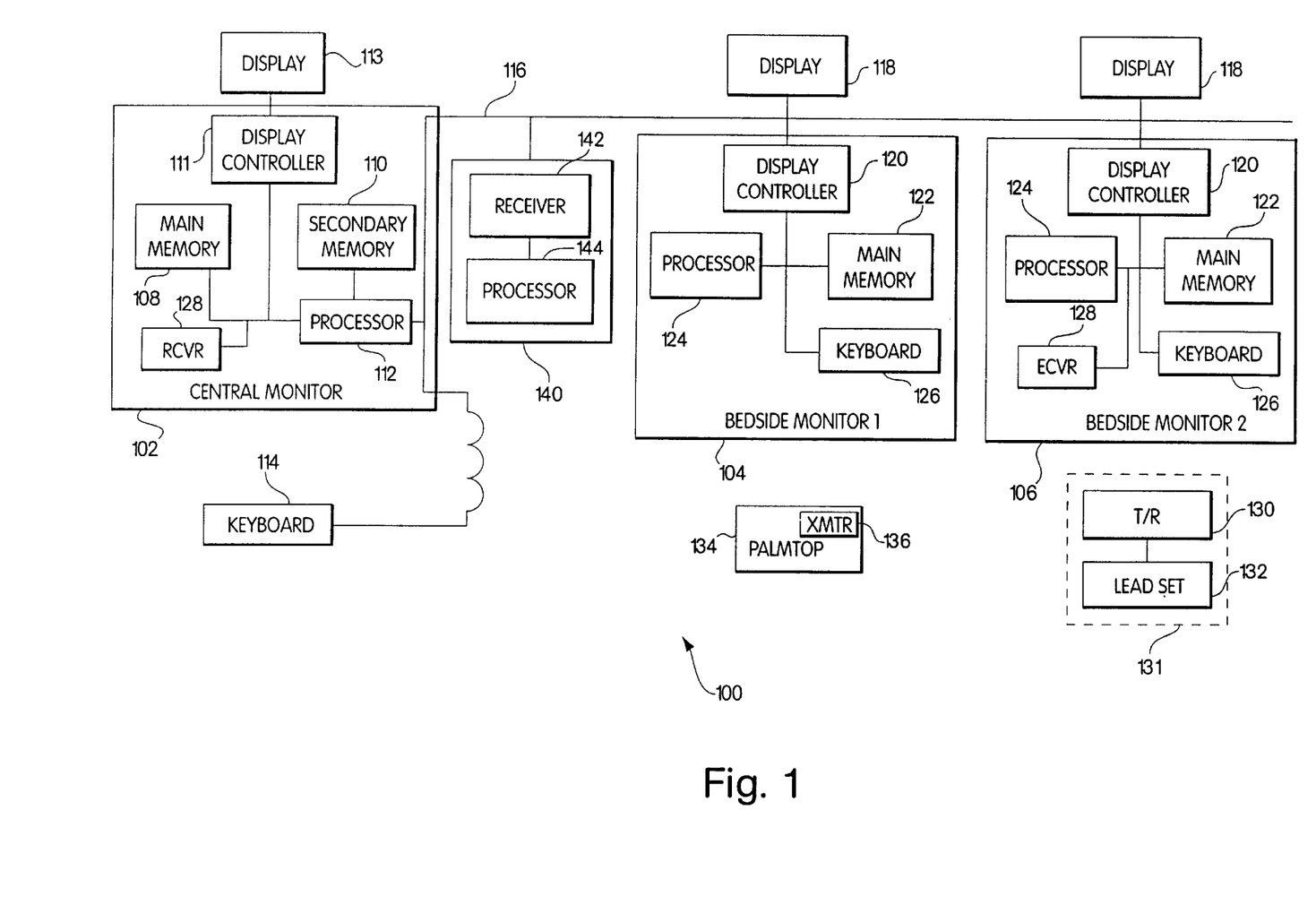
FIG. 1 illustrates a physiological monitoring system in which the method and apparatus of the present invention are embodied.

An example of a physiological monitoring system 100 in which the method and apparatus of the invention may be utilized is illustrated in FIG. 1. The physiological monitoring system includes at least one central monitor 102, and at least one bedside monitor 104 and/or telemetry monitor 131. The central monitor includes a main memory 108 for holding system data and/or data that may be provided by users of the system. For example, the data may be provided by users at the central monitor such as, for example, by a keyboard 114, and/or may be provided by any of the bedside monitors and the telemetry monitors. A secondary memory 110 may also be provided for maintaining the integrity of the database of the system. The central monitor also includes a processor 112 for reading and writing of data from the database stored in the main memory. The central monitor also includes a display controller 111 that controls display of the data on a display 113. The central monitor is preferably located at a central location within, for example, a hospital. The bedside monitors and the telemetry monitors, on the other hand, are preferably located within a care unit and are connected to the central monitor via a network 116.

A bedside monitor 104 has a display 118 for displaying information received by the bedside monitor from a patient. The bedside monitor also includes a main memory 122 for storing local copies of data and programs, and a processor 124 which is capable of performing read and write requests for the data from the main memory and performing operations on the data. The processor also controls a display controller 120 that controls the display of the information on the display or on, for example, another output device. The bedside monitor also includes an input device 126 such as, for example, a keyboard, a mouse or a touch screen. The bedside monitor is connected to a patient, for example, by lead wires to monitor various patient physiological information such as, for example, heart rate, blood oxygen content, and the like. The bedside monitors are connected by the network 116 to the central monitor 102. A bedside monitor is preferably provided for each patient in a hospital.

The physiological monitoring system 100 may also include at least one telemetry monitor 131. The telemetry monitor includes a lead set 132 that is connected to the patient to monitor the patient physiological information. The telemetry monitor also includes a wireless transmitter/receiver 130 that may communicate via wireless signals with, for example, receiver module 140 may be coupled to the network 116 and may include, for example, a wireless receiver 142 and a processor 144 so that the telemetry monitor communicates with the central monitor through the receiver module and the network 116. In addition, the system may include a portable computer 134 such as, for example, a palmtop that includes a wireless transmitter 136. The palmtop may be used by hospital personnel such as, for example, a doctor to monitor and communicate with the telemetry monitor.

It is to be appreciated that the wireless communications between the telemetry monitor 131 and the central monitor 102 can be at any frequency range and is preferably at the VHF frequency range. It is also to be appreciated that although it has been illustrated that the telemetry monitor uses wireless communication through the receiver module 140 and the network 116 with the central monitor, that various alternatives are also included in the scope of the invention. For example, the telemetry monitor may communicate with a bedside monitor 106, that includes a wireless receiver 128. Such a bedside monitor 106 may in addition to the wireless receiver 128, have a main memory 122, a display controller 120, a display 118, a processor 124 and an input device 126 such as described above with respect to the bedside monitor 104. Alternatively, the telemetry monitor may communicate directly with the central monitor 102 that may also include a wireless receiver 128.

It is to be appreciated that the physiological monitoring system 100 of FIG. 1 can have a plurality of features, thus a plurality of settings and even a plurality of possible options that may or may not be enabled for the system. In particular, the system as shipped from the factory may include a data structure having predefined factory settings for the system for each possible option of the system. However, the user may not purchase all of the options and therefore some of the options may be disabled. In addition, the user may desire to change the settings of the system for a particular environment where the system is to be used. As will be discussed in detail below, one aspect of the present invention is a method of creating or modifying a data structure that contains preferred settings of the system. In a preferred embodiment, the method is embodied in software that is shipped with the system and runs on the system or on a stand alone processor such as a personal computer. The user or administrator of the system uses the method to create or modify the data structure having user defined settings according to the preferences of the user. The data structure can then be used to configure the system and a computer based training device associated with the system, as will be discussed in detail below.

Figure 2A:
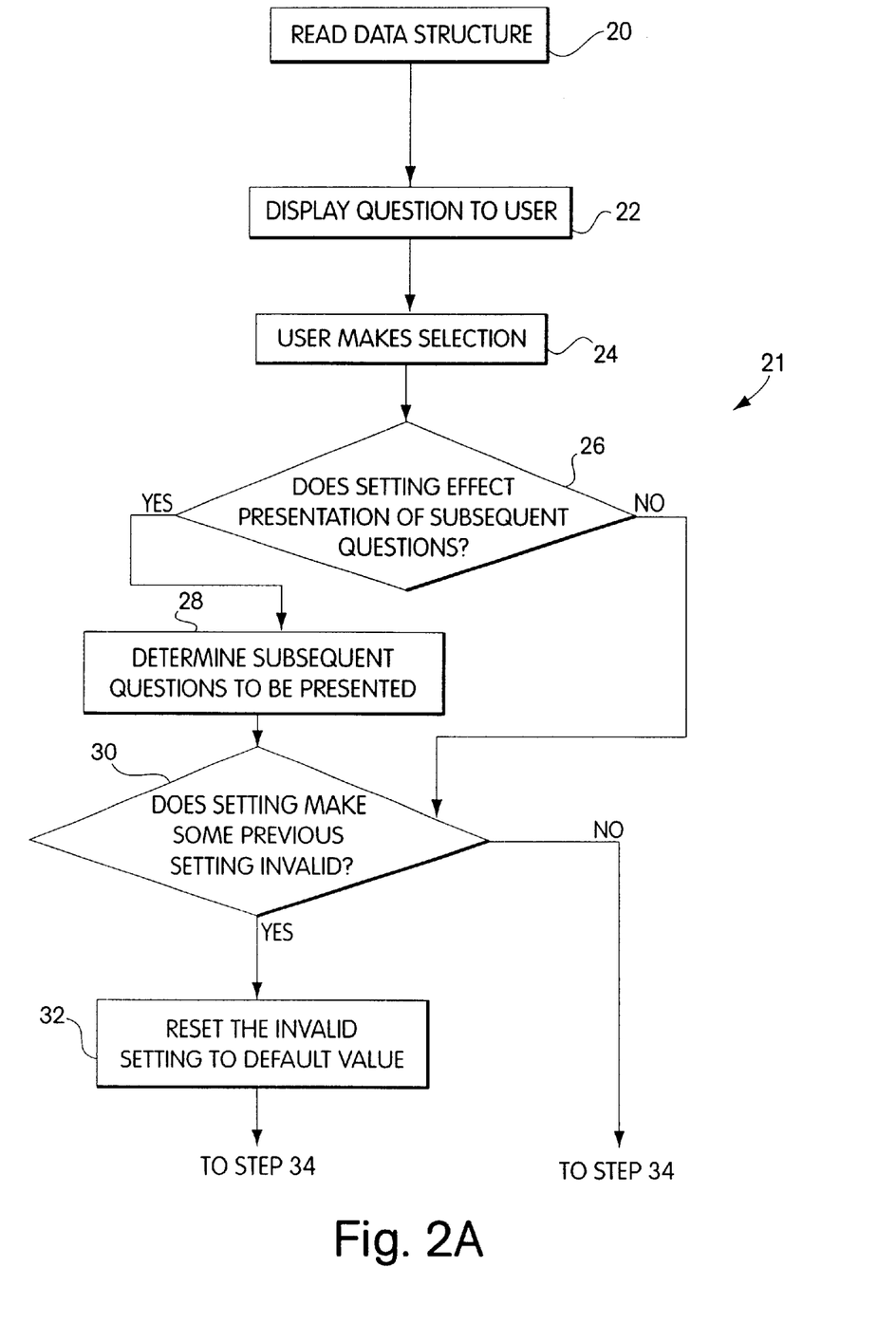
FIGS. 2A–2C illustrate a flow chart of a method of creating a data structure, according to the present invention.
Figure 2B:
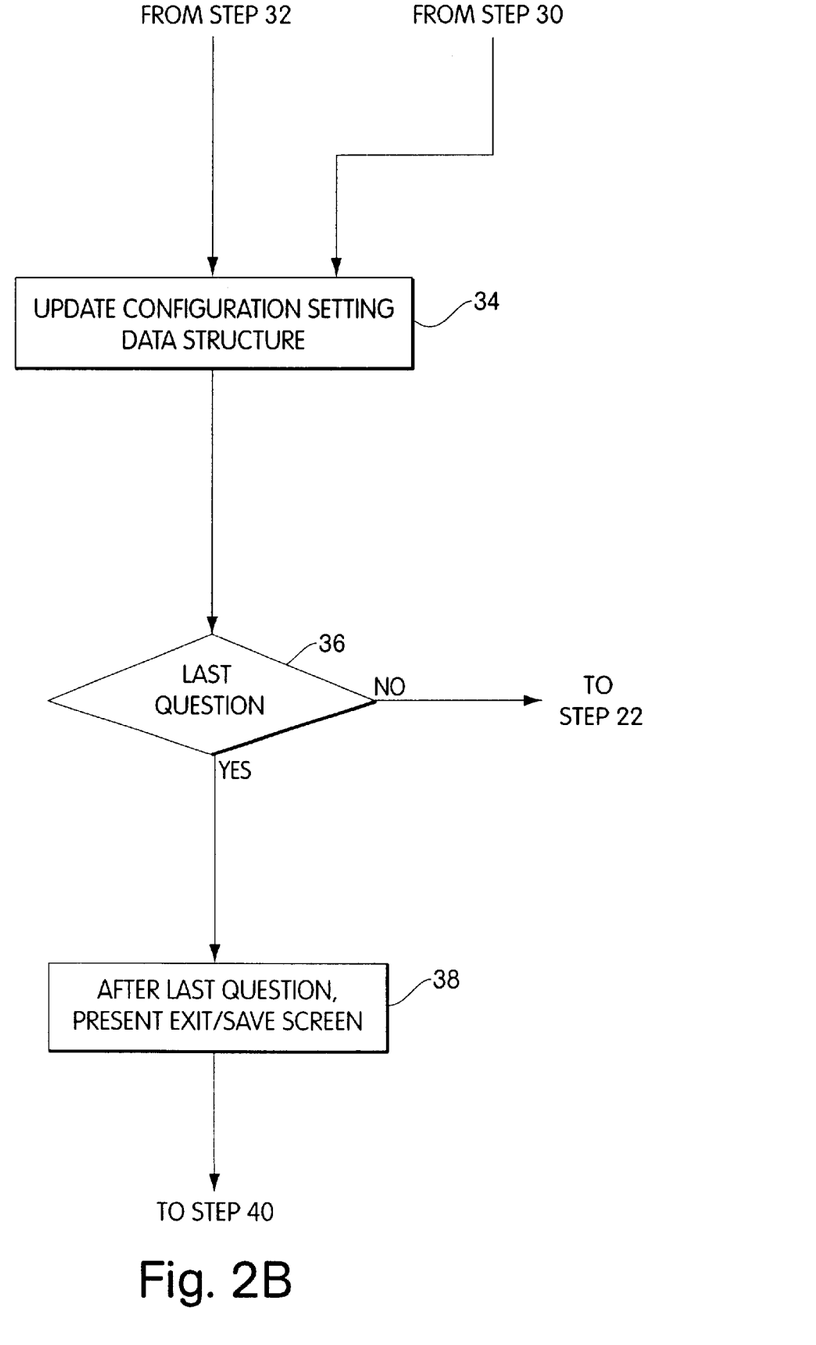
Figure 2C:
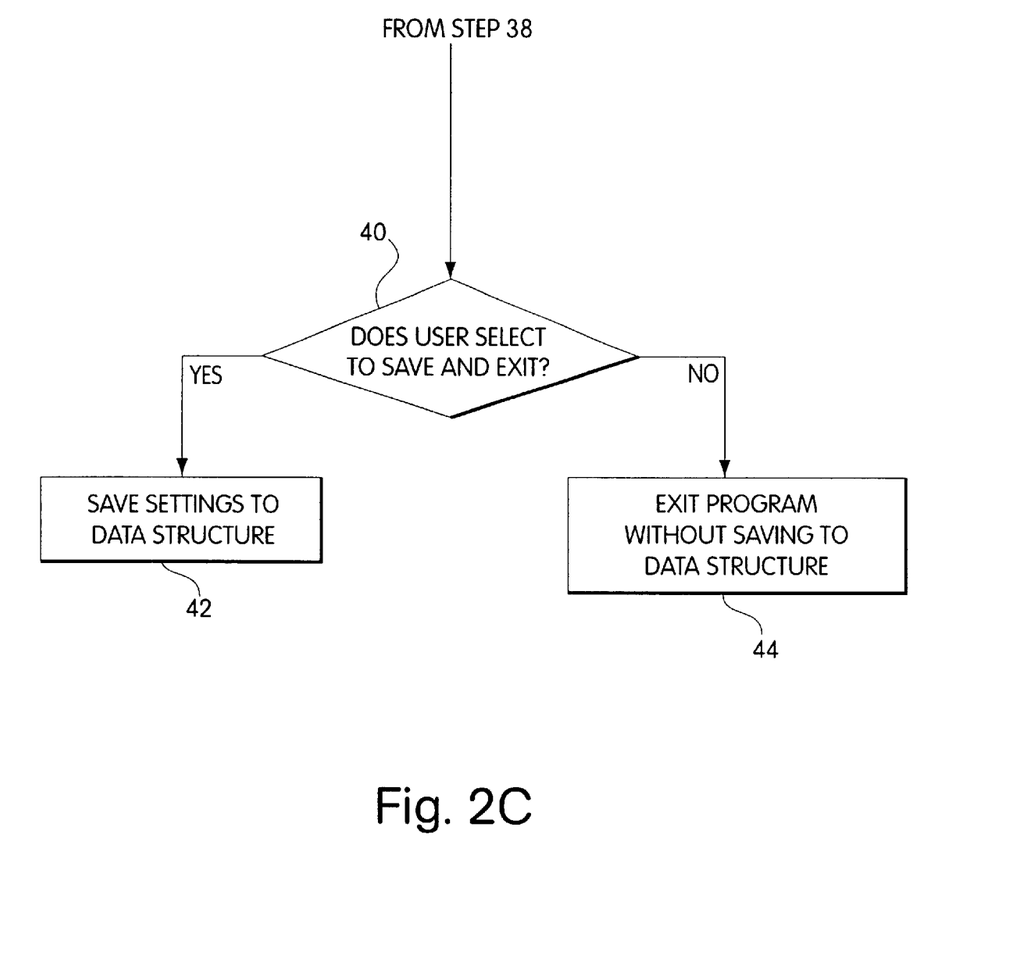

One embodiment of the method of creating or modifying the data structure that has a plurality of product settings for the physiological monitoring system 100 of FIG. 1, will now be described in connection with FIGS. 2A–2C. The method can be used by the user or system administrator to configure the physiological monitoring system for a particular environment where the system is used and/or for particular options that the system may have. This method is described with reference to the flow chart of FIGS. 2A–2C. In a preferred embodiment of the invention, the method of FIGS. 2A–2C is embodied in software code stored on a computer readable medium that may be shipped to a customer, for example, with the physiological monitoring equipment or separately. In addition, the software embodying the method is preferably stored in memory of a computer or stored in the main memory 108 of the central monitor 102. The data structure created by the method is preferably stored on a computer readable and writable medium such as, for example, a diskette and is also preferably stored in the main memory 108 of the central monitor.

A first step 20 of the method 21 is to read product setting information that has been stored in the data structure. The data structure may be the data structure provided with the system that includes the factory settings of the product settings for all possible options of the system and that was initially created at the factory, or may be the data structure that has been created by the method 21 to configure the product settings. The method in general includes a series of questions to be answered by the administrator or a user of the system that allows the user to create or modify the data structure including the plurality of settings of the product such as, for example, the physiological monitoring system 100. As will be discussed in detail below, the data structure provided by the method may be used to configure the product and may be used to configure a training device associated with the product to train a user on proper use of the product according to the product settings contained in the data structure. In other words, the data structure may also be used by the training device to tailor lessons presented by the training device and, in particular, to tailor the content of the lessons according to the configuration settings of the data structure. In addition, the data structure may also be used to configure questions provided by the training device to test the user's knowledge of the product and to certify or clear the user for use of the product.

Figure 3:
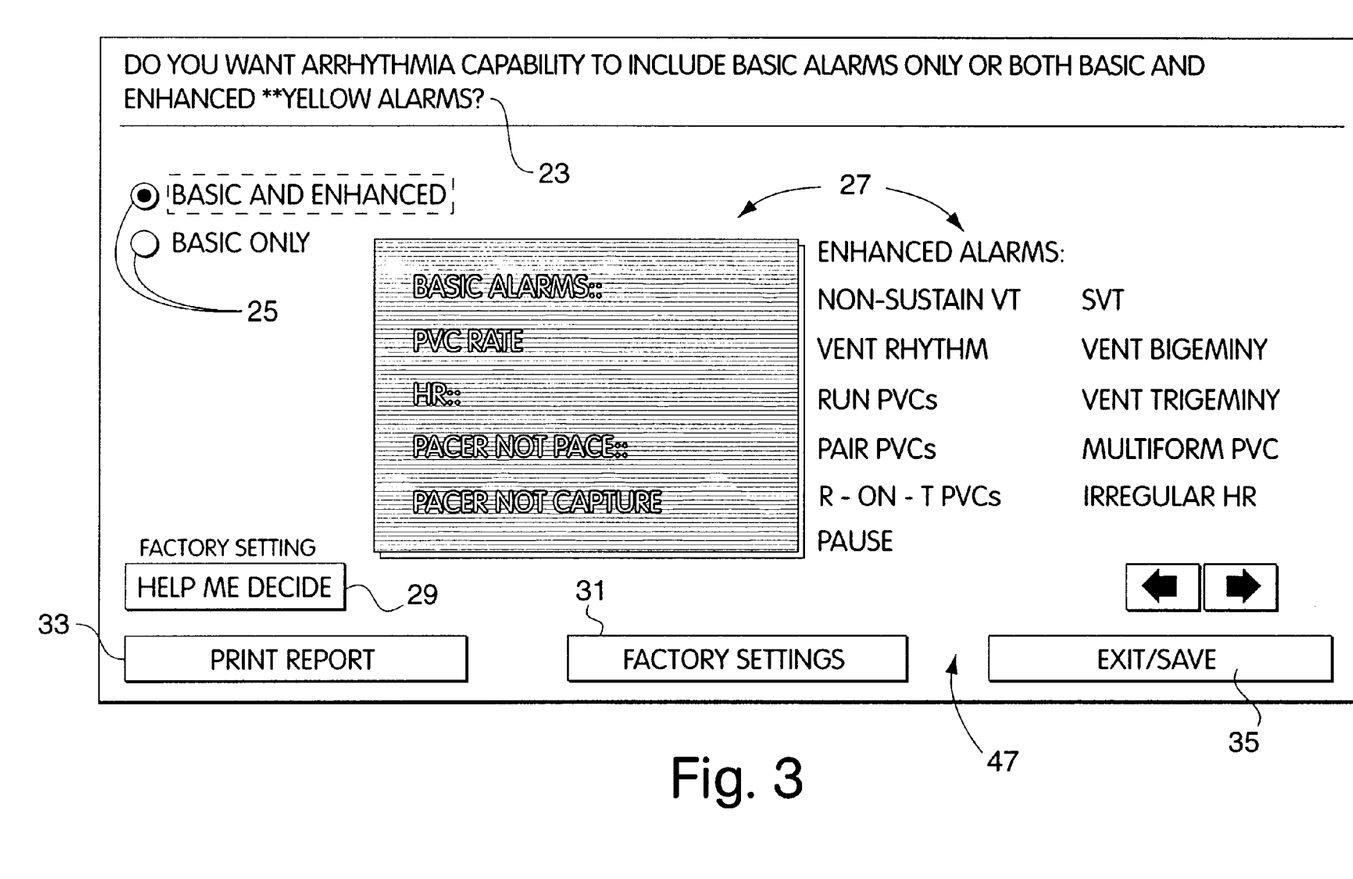
FIG. 3 illustrates an example of a display screen provided by the method of FIG. 2.

A second step 22 of the process of FIG. 2A is to display a question corresponding to a configuration option of the product to the user. FIG. 3 illustrates an example of a display screen 47 provided to the user in step 22. The display screen includes both visual and text information regarding a question 23, various possible answers 25 to the question and text information 27 indicating the implications of the various answers to the question. The display screen also includes a number of keys that the user may click on such as, for example, a "help me decide" key 29 which provides the text information to the user regarding the question 23 and the possible answers 25 to the questions; a factory settings key 31 that displays the factory settings and allows the user to choose the factory settings; a print report key 33 that allows the user to print a report of the product settings that have been selected, and an exit/save key 35 that allows the user to exit the method and either save or not save the product settings that have been selected by the user.

Referring again to FIG. 2A, once the question has been displayed to the user in step 22, the user in step 24 makes a selection of a product setting such as, for example, by clicking on the appropriate answer in the display of FIG. 3. In response to the selection made by the user, the method in step 26 determines whether the selected product setting made by the user affects subsequent questions to be asked; if the selected product setting made by the user does affect subsequent questions to be asked, the method in step 28 then determines the subsequent questions to be asked and goes to a next step 30 which determines whether the selected product setting invalidates any previously selected product settings. Alternatively, if the product setting selected by the user does not affect the presentation of subsequent questions to be asked by the method, the method goes directly from step 26 to step 30. If the selection made by the user does invalidate any of the previous product setting selections because, for example, the selected product setting is not consistent with a previous product setting, then the method in step 32 resets the invalid product setting by placing a default value in a field of the data structure corresponding to the configuration option. It is to be appreciated that the default value can be any value such a null value or the product setting initially set by the factory. In contrast, if the selection made by the user does not invalidate any of the previous selected configuration settings, then the method goes directly to step 34 (see FIG. 2B).

Figure 4:
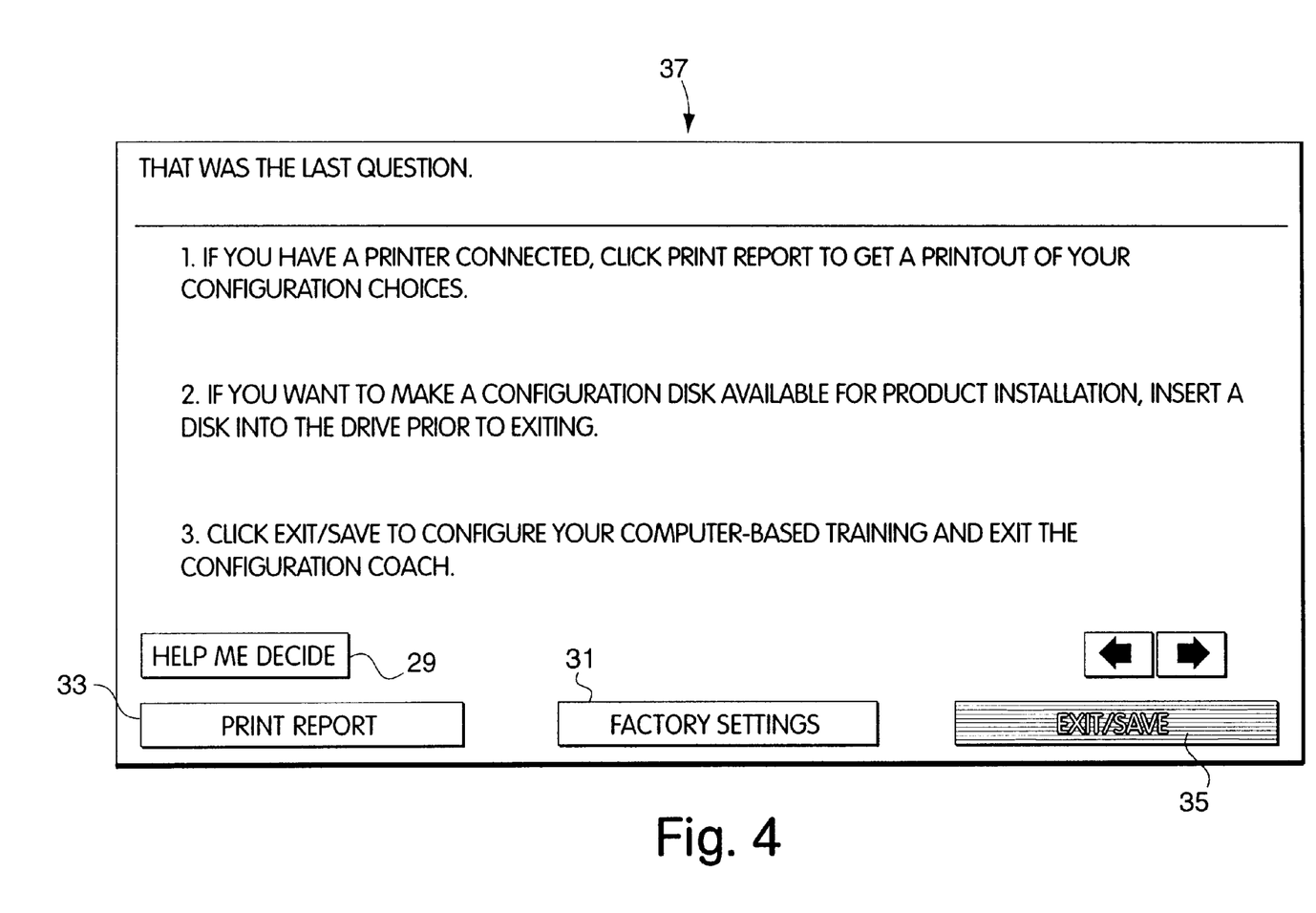
FIG. 4 illustrates an example of an exit screen provided by the method of FIG. 2.

Referring now to FIG. 2B, after either of steps 30 and 32, the method in the step 34 updates the configuration field of the data structure with to the respective product setting. The method in step 36 then determines whether the previous query and answer was the last query of the method. If the previous query was not the last query, the method then loops back to step 22 (see FIG. 2A) and displays a next display screen 47 (step 26) including a next question 23 (see FIG. 3), and the method then awaits the user to make a selection in response to the next question. In contrast, if the previous question and answer was the last question of the method, the method then proceeds to step 38, wherein the method asks the user whether to exit the method and save the product setting information in the data structure. An example of a display screen 37 provided by step 38 is illustrated in FIG. 4. The exit/save display screen 37 informs the user that a printout of the product settings may be made by clicking on the print report key 33 and instructs the user to insert, for example, a disk into the proper disk drive prior to selecting the exit/save key if the user desires to save the product setting selections to a new data structure on the disk.

Referring now to FIG. 2C, the user decides, for example, by clicking on the exit/save key 35 whether the product settings are to be saved or not saved to the data structure in step 40. If the user's answer is yes, the product settings information is stored in step 42 in the data structure, and if not, the method is exited in step 44 without saving the product settings in the data structure.

Figure 5:
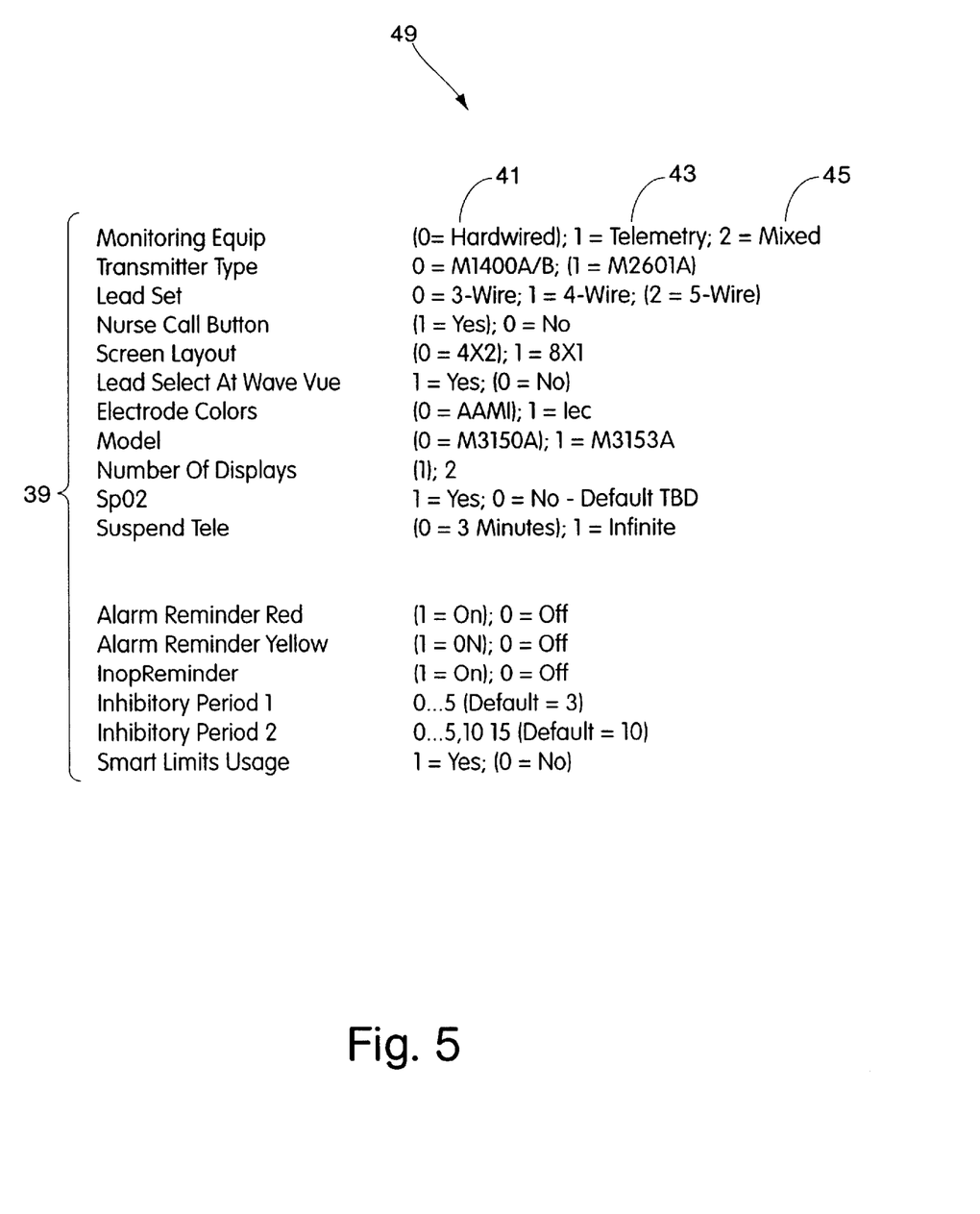
FIG. 5 illustrates an embodiment of the data structure including the plurality of configuration fields and a plurality of possible product settings for each configuration field, according to the invention.

FIG. 5 illustrates an embodiment of the data structure 49 created by the method 21 according to the invention. The data structure includes a plurality of fields 39 corresponding to configuration options of the product such as, for example, what lead set is to be used with the system, what is the screen layout of the system, and the like. Each field has associated with it a plurality of product setting options 41, 43 and 45 that are selected according to the method described above to yield a defined product setting associated with each field of the data structure. The selected product settings for each configuration field can be read by both the product itself such as, for example, the physiological monitoring system 100 of FIG. 1, and by the training device associated with the product to train a user how to use the product. This facilitates both the product and the training device having identical product settings and tailors the training device to the specific configuration settings of the product.

In a preferred embodiment of the present invention, the method 21 of creating the data structure and the configurable lessons of the training device are embodied in software and may reside on a computer readable medium such as, for example, a CDROM. The customer who purchases the physiological monitoring system 100 of FIG. 1 or, a component of the system such as, for example, the central monitor 102 also receives the CDROM. The training software resides on the CDROM, with an installation program, and various lesson content data structures of the training software. After an administrator or user of the physiological monitoring system has installed the method 21 of creating the data structure on the central monitor 102 or a personal computer and executes the method to generate the data structure 49, the data structure can then be used to configure the training software. In particular, the user or administrator can install the training software on the personal computer where the training is to occur or, for example, on the central monitor 102 of the physiological monitoring system FIG. 1. It is therefore to be appreciated that a training device of the present invention is defined as a computer based platform such as a personal computer or the central monitor 102 of the system 100, having the training software and lesson content data structure stored on the platform.

The training device software reads the data structure either stored in the main memory 108 of the central monitor 102, the memory of the personal computer, or stored on a readable and writable medium such as a computer readable disk, and configures itself from the product settings in the data structure. In particular, during configuration of the training device, menus are re-built so that they reflect only the topics that are relevant to the desired product settings. Also, during configuration a list of screens that will be displayed by the training device for each topic is re-built to reflect the product settings, and the visual characteristics of the screens are adjusted to reflect the product settings.

Figure 6:
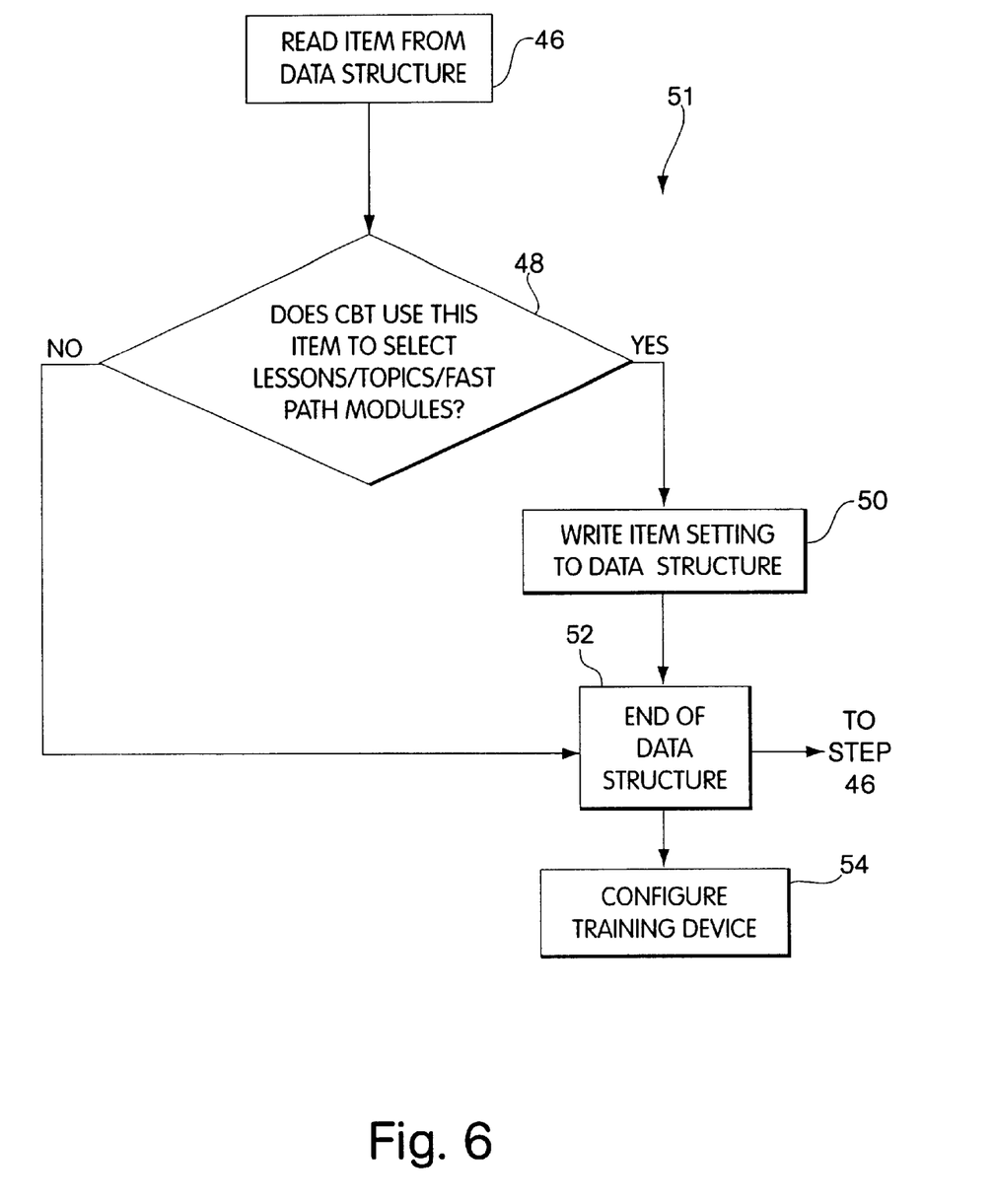
FIG. 6 is a flow chart illustrating a method of building menus and screens, visual characteristics and lessons of the training device according to the data structure of the present invention.

FIG. 6 illustrates a method 51 that the training device uses to configure itself based upon the product settings in the data structure 49. In particular, the method in a first step 46 reads the product setting 41, 43 or 45 associated with a configuration field 39 (see FIG. 5) from the data structure that was created by the method 21, as discussed above. The method then determines in step 48 whether this product setting will be used by the training device to rebuild any of the program menus for the product setting, to rebuild the list of screens that will be displayed by the training device such as, for example, the lesion screens presented to the user, or to adjust the visual characteristics of the screens to reflect the product setting. If the product setting is to be used by the training device for any of these purposes, the product setting is stored in step 50 in a data structure associated with the training device and the method then determines in step 52 whether the last configuration field in the data structure has been read. Alternatively, if the product setting is not used by the training device, the method goes directly to step 52. If the method in step 52 determines that the last configuration field of the data structure has not been read, the method then loops back to step 46 to read the next field in the data structure. In contrast, if the method in step 2 determines that the last configuration field in the data structure has been read, the method in step 50 configures the menus, the list of screens and the visual characteristics of the training device according to the product settings read by the method 51 in step 54.

Figure 7:
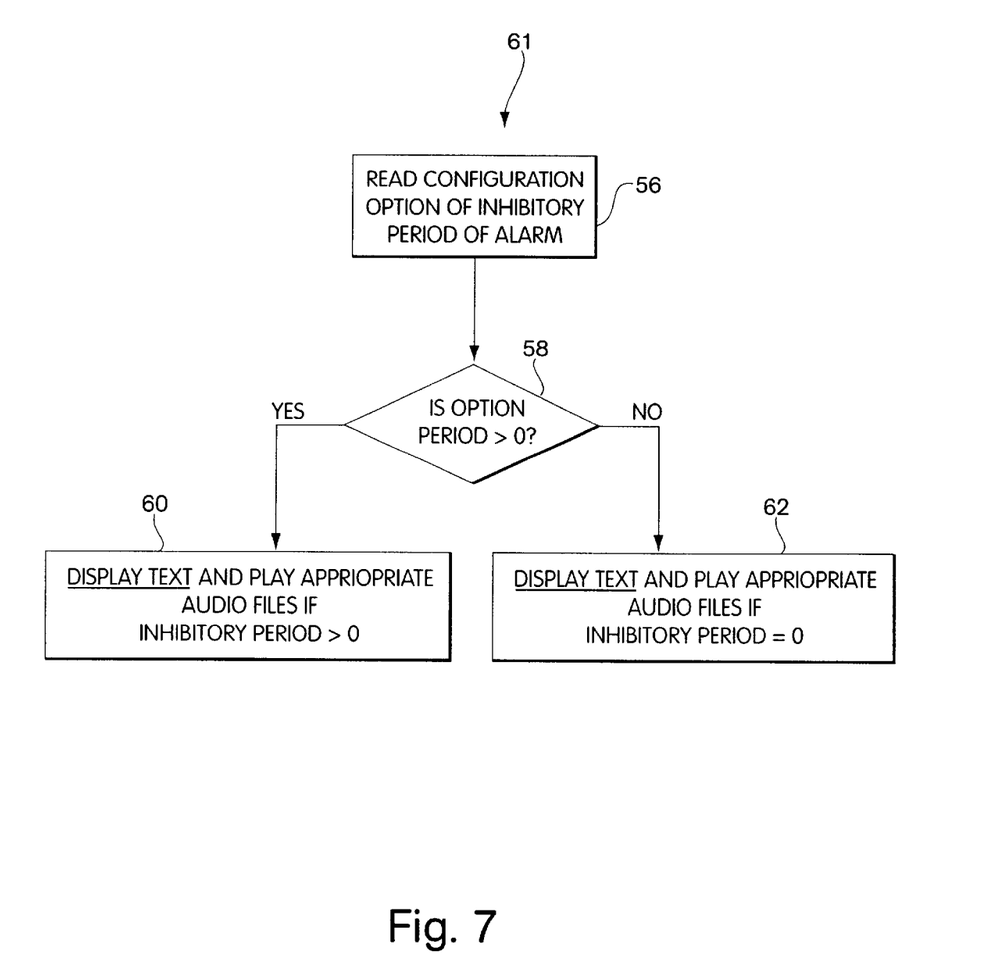
FIG. 7 is a flow chart illustrating an example of the method of FIG. 6 for configuring the training device according to the data structure of the invention.

FIG. 7 illustrates an example 61 of the method 51 of FIG. 6, and in particular illustrates one configuration option of the training device being configured for a product setting. In step 56, the training device reads the product setting for the configuration field from the data structure created by the method 51. For this example, the training device reads the configuration field in the data structure corresponding to an inhibitory period of an alarm of the physiological monitoring system of FIG. 1. The inhibitory period field contains a number of minutes for which an alarm is inhibited such as, for example, when a same condition occurs with a patient that initially triggered the alarm. The method of FIG. 7 determines in step 58 whether the inhibitory period is greater than zero minutes; if the inhibitory period is greater than zero minutes, the method in step 60 builds and displays corresponding text and outputs a corresponding audio file for instructing the user as to the operation of the physiological monitoring system when the inhibitory period has been set to a number of minutes greater than zero. In contrast, if the inhibitory period has been set to zero, the training device in step 62 builds and displays the corresponding text and outputs a corresponding audio file for the physiological monitoring system when no inhibitory period has been set for the alarm. It is to be appreciated that although one example of a configuration field for the physiological monitoring system 100 has been illustrated and described, the method and apparatus can be used for any product setting for the physiological monitoring system of FIG. 1. In addition, it is to be appreciated that this method and apparatus can be used for any training device associated with any product and is not limited to a physiological monitoring product or system.

Figure 8:
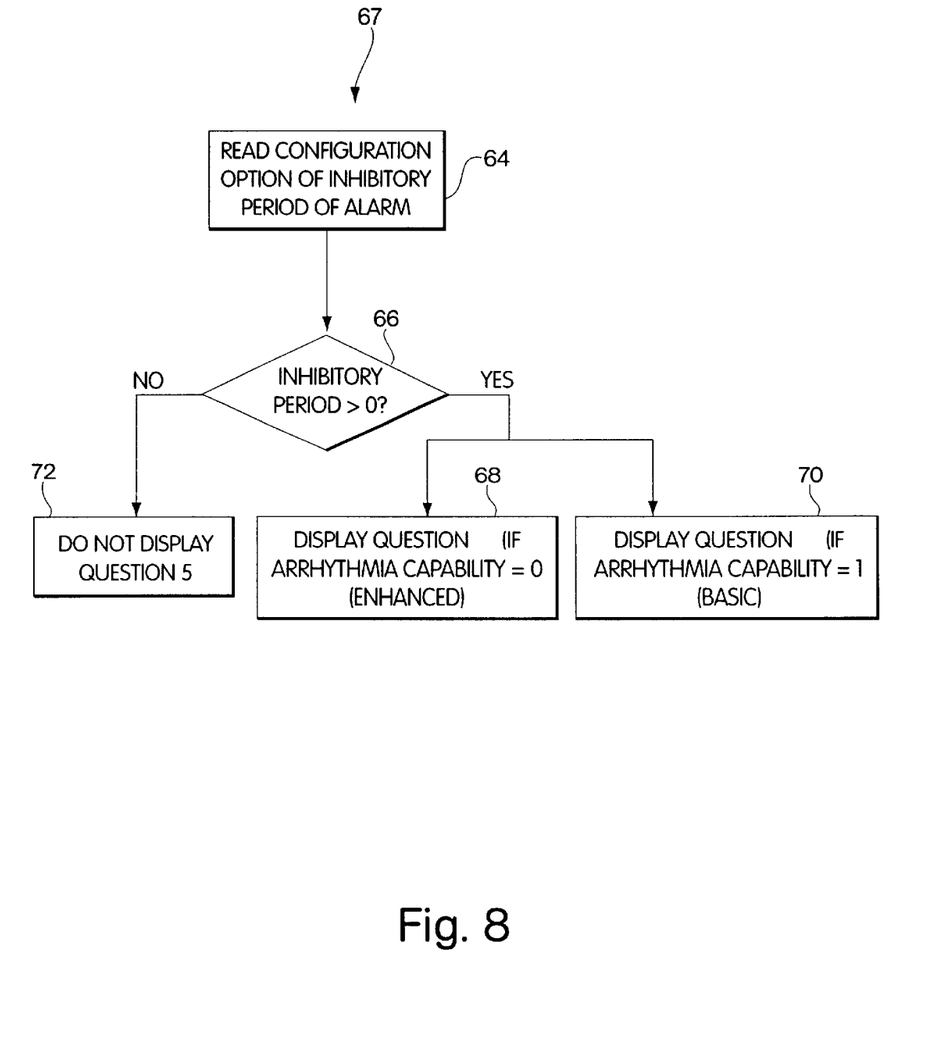
FIG. 8 is a flow chart illustrating a method of configuring an exam portion of the training device according to the present invention.

FIG. 8 illustrates a method 67 implemented in the training device to configure an exam portion of the training device. For the purpose of illustration, the example of the inhibitory period setting of the alarm option of physiological monitoring system 100 of FIG. 1 is again used to illustrate this method, but it is to appreciated that the method and apparatus of the invention is not limited to any particular product setting or to a health-care product. The training device in step 64 reads the configuration field and its product setting from the configuration data structure and in step 66 determines whether the inhibitory period has been set to greater than zero minutes or equal to zero minutes. If the inhibitory period has been set to greater than zero minutes, the training device displays at least one corresponding question with respect to the alarms of the physiological monitoring system 100 of FIG. 1. In this example, the question displayed in either of steps 68 or 70 depends upon whether the bedside monitor 104 or 106 (see FIG. 1) is configured with enhanced or basic Arrhythmia capability. This can be determined for example from another configuration field in the data structure. If an enhanced Arrhythmia product setting has been selected in the corresponding configuration field, a corresponding question is displayed in step 68 to test the user's understanding of the operation of the enhanced Arrhythmia operation of the physiological monitoring system; if a basic Arrhythrnia product setting has been selected, a corresponding question is displayed in step 70 to test the user's understanding of the operation of the physiological monitoring system with the basic option. If the inhibitory period has not been set to greater than zero minutes, then the training device does not display the corresponding questions with respect to the Arrhythmia alarms capability (step 72).

It is to be appreciated that the exam of the training device may provide lessons tailored to the particular configuration of physiological monitoring system. The training device may also allow the user to, for example, book mark information to review at a later date, and may be used by a manager or supervisor, for example, to monitor the user's progress and may possibly be used for certification of the user on the system or to obtain continuing education credits. The manager may also, for example, print a report of the results of the exam to track the user's progress on the system.

From the above, it can be seen that the data structure can be used by the training device to configure the training device to the specific product settings of the data structure. An advantage of the method and apparatus for producing the data structure and the method of configuring the training device is that the training device can be tailored to the specific configuration settings of the associated product. Another advantage is that the training device does not require a customer service representative to be present at the location where the system is to be used, because it provides the capability to tailor the product and the training device without requiring additional information from the customer service representative.

Figure 9:
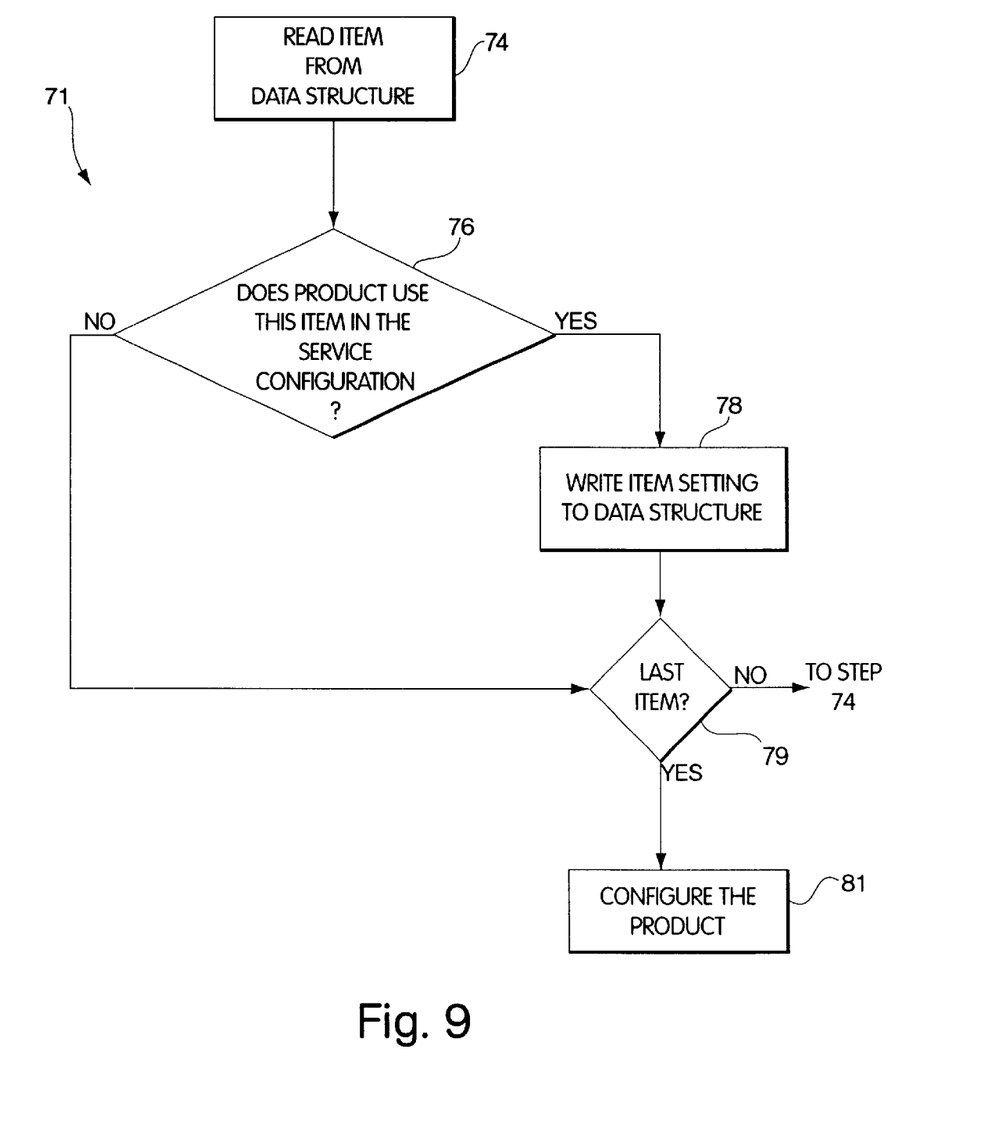
FIG. 9 is a flow chart illustrating a method of reading the data structure according to the present invention.

According to another aspect of the method and apparatus of the invention, the product such as the physiological monitoring system 100 of FIG. 1, also uses the data structure to configure the product settings of the product. FIG. 9 illustrates an example of a method 71 of configuring the product. For example, during installation of the physiological monitoring system on site such as, for example, at a hospital, the system administrator or the customer engineer executes an installation process which in step 74 reads the product setting for each configuration field in the data structure. The installation process then determines in step 76 whether the product uses this product setting for the particular product configuration of the product. If the particular product setting is to be used in the product configuration, the product setting may, for example, be stored in another data structure in the product such as, for example, in the main memory of the central monitor 102 of FIG. 1 (step 78). If the product setting is not to be used by the product, then the method goes directly to step 79, skipping step 78, and determines whether the configuration field was the last configuration field in the data structure. If the configuration field was not the last configuration field, then the method loops back to step 74 and the next configuration field in the data structure is read (step 74). In contrast, if the configuration field was the last configuration field in the data structure, the method configures the product (step 81) according to the product settings of the data structure.

Figure 10:
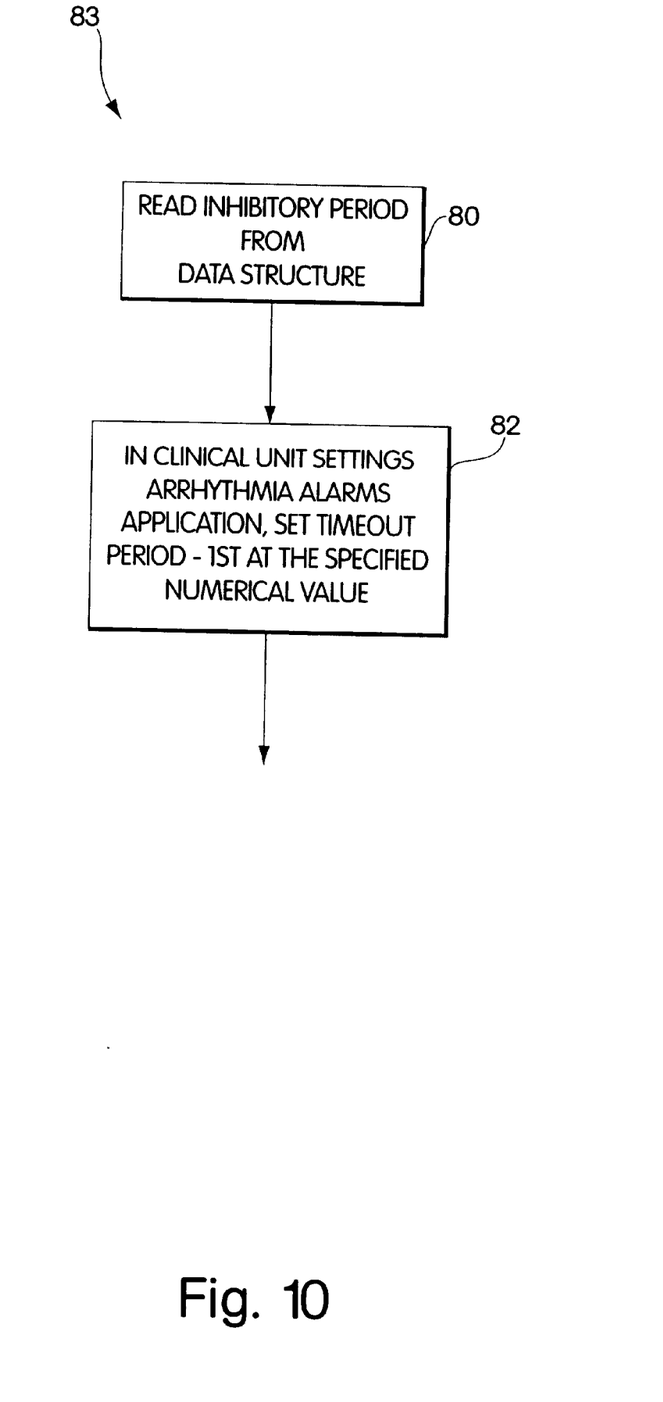
FIG. 10 is a flow chart illustrating a method of configuring the product according to the data structure of the invention.

An example 83 of the step 81 of configuring the product of the method 71 of FIG. 9 for the physiological monitoring system 100 using the data structure is illustrated in FIG. 10. For consistency and by way of example, the configuration field discussed above is again used to illustrate this method. In step 80 the product reads the product setting from the data structure of the product. In step 82 the product sets the inhibitory period of the alarm of the physiological monitoring system according to the inhibitory period specified by the product setting of the corresponding configuration field in the data structure. As discussed above, the inhibitory period determines the number of minutes that subsequent occurrences of an alarm will be inhibited if the alarm condition that generated the alarm continues.

It is to be appreciated that although one example has been illustrated as to how the product uses the configuration field within the data structure to configure the product, the method and apparatus of the invention can be used to configure any setting of the product based on a corresponding configuration field within the data structure. It is also to be appreciated that the method and apparatus can be used in a plurality of ways to configure the product. For example, the product, such as the physiologic monitoring system 100 of FIG. 1, is typically sold with a plurality of features that may or may not be purchased by the customer. Thus a customer may initially receive the system with some of the features enabled and some of the features disabled. If the customer later wishes to add on to the system by purchasing an additional feature, the method and apparatus of the invention can be used to configure the system to accommodate the additional feature and to configure the training device to instruct the user on the system including the additional feature.

Some advantages of the method and apparatus for providing the data structure and the method and apparatus for using the data structure according to the invention, are that the product can be configured to a specific configuration for a particular operating environment without, for example, requiring an on-site customer representative to be present. The method and apparatus can also be used to periodically update the configuration of the product to accommodate changes in the product configuration. The method and apparatus for providing the data structure of the invention and the method and apparatus for using the data structure also permit the users of the product to train themselves on the product for the product specific settings and, in particular, to tailor the learning objectives of the lessons and the exam of the training device, according to the configuration settings in the data structure.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A physiological monitoring system that monitors physiological characteristics of a patient and has a plurality of possible, configurable settings, comprising:

a physiological monitoring means for monitoring physiological characteristics of a patent said monitoring means being adapted for connection with a patient;

a means for configuring at least one of the plurality of settings of the physiological monitoring means according to a data structure, the data structure having at least one field defining the at least one setting;

a device for training a user on use of the system; and a means for configuring the training device according to the data structure.

2. The physiologic monitoring system as claimed in claim 1, further including:

at least one patient monitor that monitors characteristics of a patient; and a central monitor that is a central collector of information for the characteristics of a patient for each patient monitor and that is coupled to the at least one patient monitor via an interface network.

3. The physiologic monitoring system as claimed in claim 2, wherein the patient monitor is a telemetry unit, including a wireless transmitter/receiver, that is adapted to be coupled to the patient to gather a patient information, wherein the telemetry unit communicates the patient information to any of the patient monitor and the central monitor via a wireless communication path.

4. The physiologic monitoring system of claim 1, wherein the means for configuring the training device configures the training device according to at least one of the settings configured by the settings configuring means.

* * * * *